United States Patent
Fiedler

(10) Patent No.: US 7,306,232 B2
(45) Date of Patent: *Dec. 11, 2007

(54) MULTIPART OIL WIPING RING FOR PISTONS OF INTERNAL COMBUSTION ENGINES

(75) Inventor: Rolf-Gerhard Fiedler, Wendlingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/570,103

(22) PCT Filed: Sep. 1, 2004

(86) PCT No.: PCT/DE2004/001939

§ 371 (c)(1),
(2), (4) Date: Jun. 2, 2006

(87) PCT Pub. No.: WO2005/024277

PCT Pub. Date: Mar. 17, 2005

(65) Prior Publication Data

US 2006/0273525 A1  Dec. 7, 2006

(30) Foreign Application Priority Data

Sep. 2, 2003  (DE) ................................ 103 40 312

(51) Int. Cl.
*F16J 9/20* (2006.01)
(52) U.S. Cl. .................. 277/434; 277/449; 277/466
(58) Field of Classification Search ............... 277/434, 277/435, 447, 449, 454, 466
See application file for complete search history.

(56) References Cited

U.S. PATENT DOCUMENTS

| 3,430,968 A | * | 3/1969 | Hesling et al. ............ 277/479 |
| 3,738,668 A | | 6/1973 | Minegishi |
| 3,921,988 A | * | 11/1975 | Prasse et al. ............... 277/451 |
| 4,907,545 A | * | 3/1990 | Mills ...................... 123/41.35 |
| 5,193,820 A | * | 3/1993 | Tsuchiya et al. ............ 277/478 |
| 5,921,553 A | * | 7/1999 | Klein ......................... 277/492 |
| 6,039,321 A | | 3/2000 | Hwan |
| 7,036,823 B2 | * | 5/2006 | Takiguchi et al. .......... 277/434 |
| 7,044,472 B2 | * | 5/2006 | Takahashi et al. .......... 277/434 |
| 2003/0090066 A1 | * | 5/2003 | Takahashi et al. .......... 277/434 |
| 2006/0006604 A1 | * | 1/2006 | Abe et al. ................... 277/434 |

(Continued)

FOREIGN PATENT DOCUMENTS

DE  36 38 728 A1  8/1987

(Continued)

OTHER PUBLICATIONS

International Search Report.

*Primary Examiner*—Patricia Engle
*Assistant Examiner*—Gilbert Lee
(74) *Attorney, Agent, or Firm*—Collard & Roe, P.C.

(57) ABSTRACT

A multipart oil wiping ring for pistons of internal combustion engines comprises two steel strip-type lamellae with parallel sides, the running surfaces of which are provided with a convexly asymmetric shape having a vertex line that extends across the circumference of the lamellae, and a bracing spring located between the lamellae. The bracing spring presses the lamellae in an axial direction against one respective side of an annular groove in the piston and in a radial direction against the cylinder wall.

2 Claims, 1 Drawing Sheet

U.S. PATENT DOCUMENTS

2006/0061043 A1* 3/2006 Takahashi et al. .......... 277/434
2007/0017459 A1* 1/2007 Fiedler .................... 123/48 A
2007/0018410 A1* 1/2007 Fiedler ...................... 277/478

FOREIGN PATENT DOCUMENTS

| DE | 38 33 322 A1 | 12/1989 |
| DE | 43 00 531 C1 | 2/1994 |
| DE | 44 29 649 | 2/1996 |
| EP | 1 431 630 A2 | 6/2004 |
| FR | 2 723 401 A | 2/1996 |
| JP | 2000 3 20 672 A | 11/2000 |
| JP | 2001 082605 A | 3/2001 |
| WO | WO 03/058096 A | 7/2003 |

* cited by examiner

US 7,306,232 B2

MULTIPART OIL WIPING RING FOR PISTONS OF INTERNAL COMBUSTION ENGINES

CROSS REFERENCE TO RELATED APPLICATIONS

Applicant claims priority under 35 U.S.C. §119 of German Application No. 103 40 312.4 filed Sep. 2, 2003. Applicant also claims priority under 35 U.S.C. §365 of PCT/DE2004/001939 filed Sep. 1, 2004. The international application under PCT article 21(2) was not published in English.

BACKGROUND OF THE INVENTION

The invention relates to a multi-part oil control ring for pistons of internal combustion engines, having two lamellae consisting of steel strips that have parallel walls, the working surfaces of which have a barrel-shaped asymmetrical shape, in each instance, having a vertex line that extends over the circumference of the lamellae, as well as having a spreading spring disposed between the lamellae, which presses the lamellae both axially against one of the walls of a ring groove in the piston, in each instance, and radially against the cylinder wall.

In order to prevent too much motor oil from getting into the combustion chamber, which not only results in high oil consumption but also has negative effects on the emission behavior of the engine, a sufficient tangential force of the oil control rings is required to produce a radial contact pressure against the cylinder wall and thereby a good oil control effect. However, this results in a high surface pressure against the working surfaces of the steel lamellae, and therefore a high friction power during engine operation. This friction power worsens the degree of effectiveness of the internal combustion engine and accordingly increases the fuel consumption. The design of the tangential force of the oil control rings is therefore always a compromise between minimal friction power and maximal oil control effect. All of the measures for reducing the friction power during engine operation, without reducing the tangential force, thereby facilitate the design of the oil control rings, i.e. improve the degree of effectiveness of the engine.

Accordingly, an attempt was made, for oil control rings of the type stated, not only to provide a special design of the spreading spring, but also to form the working surfaces of the lamellae in such a manner that these meet the aforementioned requirements. Among other things, working surfaces that run plane-parallel to the cylinder wall are known, as indicated in U.S. Pat. No. 3,738,668, as are working surface contours that are configured to be symmetrically barrel-shaped, as described in DE 36 38 728 A1. In this connection, multi-part oil control rings having symmetrically barrel-shaped working surfaces of the lamellae are mounted in the piston in any desired installation position, i.e. not oriented.

Asymmetrical working surfaces of oil control rings or piston rings are known from DE 38 33 322 A1, DE 43 00 531 C1, or DE 44 29 649 C2. These embodiments, however, relate only to individual rings, whereby information relating to possible installation positions with regard to multi-part oil control rings cannot be derived from the references.

SUMMARY OF THE INVENTION

It is the task of the invention to indicate a multi-part oil control ring for a piston of an internal combustion engine, which has an improved oil control effect as compared with the known state of the art, at a reduced wear of the working surface.

This task is accomplished in that the working surfaces of the two lamellae are configured in such a manner that they correspond to a final contour approaching a condition of wear in the run-in state of the engine, whereby the vertex lines of the working surfaces are oriented in the opposite direction to the center of the ring groove, in each instance, in the assembled state of the oil ring in the piston. The working surfaces of the lamellae are characterized by an asymmetrical incline having a barrel shape that is greatly reduced as compared with the state of the art, whereby the working surface contour can be approximately described by means of a polynomial of the second order.

In another embodiment of the invention, the working surfaces of the lamellae are oriented in the same direction as the ring groove wall that faces away from the piston crown, in each instance, with their vertex lines.

By means of the working surface configuration according to the invention, and the arrangement of the lamellae relative to one another, a reduction in the friction power of the entire steel-band oil control ring is achieved, by means of a more advantageous hydrodynamic condition at one of the two lamellae, without any reduction in tangential force, whereby the oil-controlling function of the other lamella is maintained to its full extent, in this connection. The reduction in the friction power thereby results in an improvement of the degree of effectiveness of the engine, or the oil control behavior can be improved by means of an increase in the tangential force, with an unchanged friction power level.

Practical embodiments of the invention are the subject of the dependent claims.

BRIEF DESCRIPTION OF THE DRAWINGS

An exemplary embodiment of the invention is described below, using the drawings. These show.

DETAILED DESCRIPTION OF THE PREFERRED EMBODIMENTS

Figure 1:
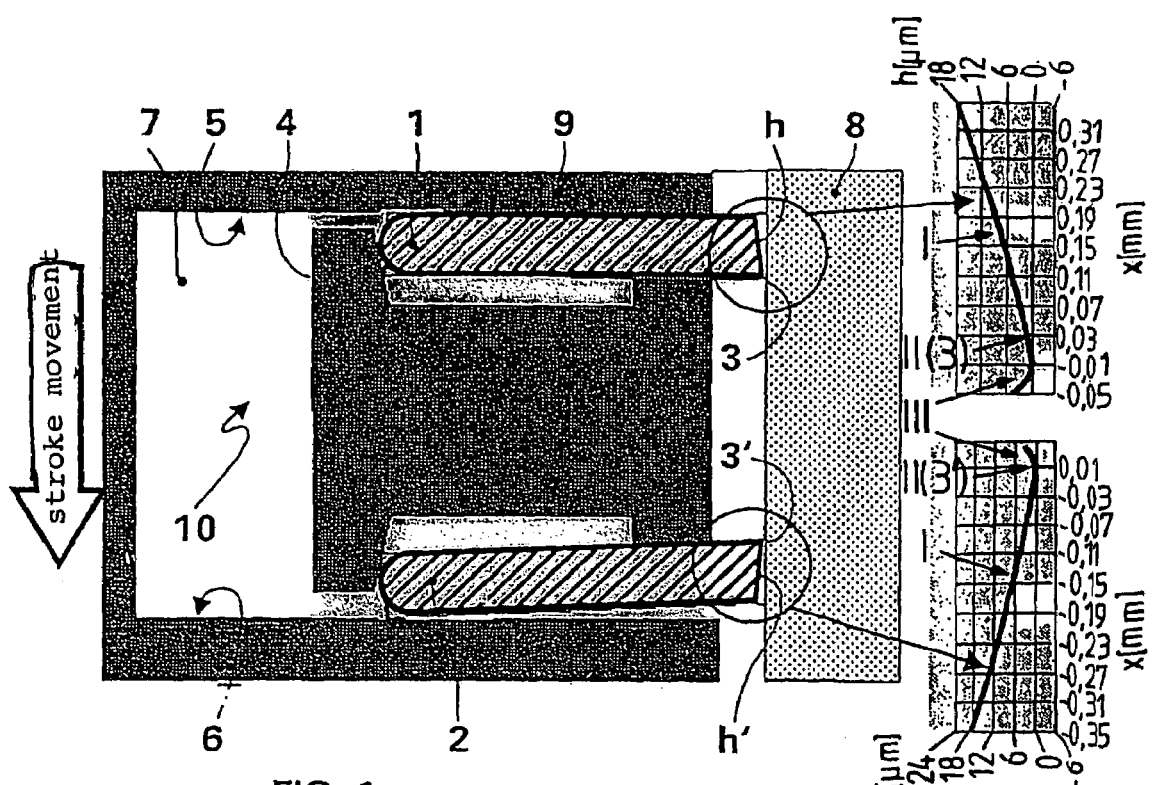
FIG. 1 a cross-section of the oil control ring according to the invention, in a first embodiment, and FIG. 2 a cross-section of the oil control ring according to the invention, in a second embodiment.
Figure 2:
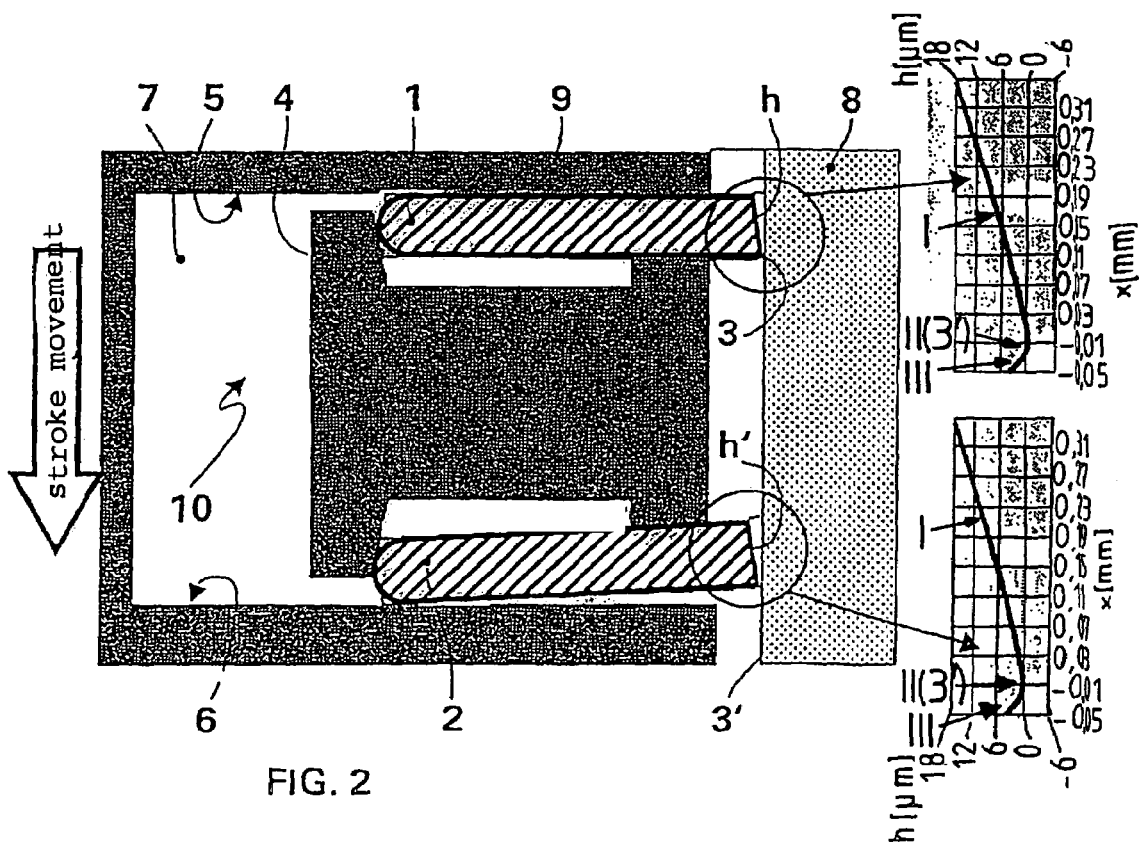

As is evident from FIG. 1, a multi-part oil control ring 10 consists of two steel-band lamellae 1 and 2 and a spreading spring 4, which presses the lamellae both axially against one of the walls 5 and 6 of the ring groove 7 in the piston, and radially against the cylinder wall 8. The ring groove wall 5 represents the piston crown side, and the ring groove wall 6 represents the side facing away from the piston crown. According to the invention, the lamella 1 has a barrel-shaped asymmetrically shaped working surface h with a vertex line 3 that extends over the circumference of the lamella, and the lamella 2 has a barrel-shaped asymmetrical working surface h' with a vertex line 3', whereby the vertex lines 3, 3', in each instance, act as edges that stand in contact with the cylinder wall 8, for oil control. In a first exemplary embodiment according to FIG. 1, the lamellae 1 and 2 are disposed relative to one another, in their assembled state, in such a manner that their vertex lines 3, 3' (edges) are oriented in the direction of the center of the ring groove 7, in each instance. According to FIG. 1, this lamella arrangement is supposed to be understood as being in opposite directions, whereas according to FIG. 2, the arrangement of the lamellae relative to one another is supposed to be understood as being in the same direction. In this exemplary embodiment, the two vertex lines 3, 3' (edges) are disposed pointing away from the ring groove wall 5 on the piston crown side, between the spreading spring 4.

According to the invention, the working surfaces h and h' of the lamellae have a shape that corresponds to a run-in process of several hundred hours of engine operation. This is characterized in that the working surfaces h, h' of the two lamellae 1 and 2, in cross-section, approximately follow the asymmetrical shape of a polynomial of the second order in a first segment (I), with $h(x)=ax+bx^2$, whereby x=working surface coordinates in the Cartesian coordinate system in mm, and a, b are coefficients, with a being defined by the ratio of the axial wall play of the lamellae relative to the width of the lamellae; b being defined as the amount of the working surface curvature; a supporting vertex (II) $h(x=0)$ configured as an edge, and in a third segment (III) approximately follows the asymmetrical shape of the function $h(x)=cx^2$, with c as a multiple of b. As an example for lamellae having a thickness of 0.4 mm, a value $h(x)=35x+50x^2$ is obtained. With this, the cross-section curves shown in accordance with FIGS. 1 and 2 can be achieved, with x as the working surface coordinate in mm, and h(x) as the barrel shape in μm. It is understandable that the coefficients of this polynomial must be coordinated with the specific application, whereby essential parameters in this connection are the cylinder diameter, the dimensions of the lamella cross-section, the configuration of the contact points on the spreading spring, and the axial play ratios of the steel-band oil control ring in the ring groove. The typical barrel shape of the working surfaces h and h' according to the invention amount to approximately 2 to 10 μm/0.4 mm as compared with embodiments according to the state of the art of 3 to 15 μm/0.15 mm.

Functionally, the oil control effect that is improved according to the invention results from the fact that the friction force that engages on the working surfaces h, h' of the lamellae in the cylinder axis direction generates a torque that causes the lamellae to arch in plate shape. This is possible because the configuration of the spreading spring 4 prevents a movement of the lamellae 1 and 2 in the axial direction, particularly on the inner contact point, whereas clearly greater axial movement amplitudes are possible at the outer contact point. The friction force, and therefore the torque, changes its sign as a function of the stroke direction of the piston. Since the amount of the friction force is still dependent on velocity, this results in a constant change in the plate-shaped arch, referred to as dynamic twist. Because of the dynamic twist, the lamella that rests against one of the groove walls, depending on the stroke direction, produces a good oil control effect, in combination with the asymmetrical incline of the working surface—the "edge" works—while the other lamella, in each instance, has improved hydrodynamics because of the defined barrel shape of the working surface—the "surface" works—as shown in FIG. 1. In this way, the friction power at this lamella, which furthermore has a worse oil control effect in the twisted state, is reduced. A change in the stroke direction causes the two lamellae to flip over into the other position, in each instance, but this fundamentally does not change anything with regard to the relationships described.

Attention must be paid to ensure orientation of the lamella in the correct position when the multi-part steel-band oil control ring is put together; this can be guaranteed, for example, by means of color markings on one of the lamella walls.

The production of the working surface shape, i.e. contour can take place by means of lapping, for example.

| | Reference Symbols |
|---|---|
| 10 | oil control ring |
| 1 | lamella |
| 2 | lamella |
| 3 | vertex line (edge) |
| 3' | vertex line (edge) |
| 4 | spreading spring |
| 5 | ring groove wall on the piston crown side |
| 6 | ring groove wall on the side facing away from the piston crown |
| 7 | ring groove |
| 8 | cylinder wall |
| 9 | piston |
| h, h' | working surfaces |

The invention claimed is:

1. A multi-part oil control ring for pistons of internal combustion engines, comprising:
   two lamellae consisting of steel strips and having parallel walls, working surfaces of each lamella having an asymmetrical barrel shape, and having a vertex line that extends over a circumference of the lamellae and being oriented in an opposite direction to a center of a ring groove of the piston, in the assembled state of the oil ring in the piston; and
   a spreading spring disposed between the lamellae, said spreading spring pressing each of the lamellae both axially against one of the walls of the ring groove in the piston, and radially against a cylinder wall;
   wherein the working surfaces of the two lamellae are configured in such a manner that they correspond to a final contour approaching a condition of wear in a run-in state of the engine, and
   wherein the working surfaces of the two lamellae, in cross-section,
   a. follow the asymmetrical shape of a polynomial of the second order in a first segment (I), with $h(x)=ax+bx^2$, whereby
   b. x=working surface coordinates in the Cartesian coordinate system in mm, and a, b are coefficients, with a being defined by the ratio of the axial wall play of the lamellae relative to the width of the lamellae; b being defined as the amount of the working surface curvature;
   c. a supporting vertex (II) $h(x=0)$ configured as an edge, and
   d. in a third segment (III) follows the asymmetrical shape of the function $h(x)=cx^2$, with c as a multiple of b.

2. A multi-part oil control ring according to claim 1, wherein the vertex lines of each of the working surfaces of the lamellae are oriented in the same direction as the wall of the ring groove that faces away from the piston crown.

* * * * *